(12) United States Patent
Hartling et al.

(10) Patent No.: US 9,581,201 B2
(45) Date of Patent: Feb. 28, 2017

(54) BEARING

(71) Applicant: Schaeffler Technologies AG & Co. KG, Herzogenaurach (DE)

(72) Inventors: Otmar Hartling, Schonungen (DE); Thomas Fickert-Guenther, Hirschaid (DE); Manuel Lommel, Grettstadt (DE); Volker Kestler, Gochsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/651,149

(22) PCT Filed: Nov. 13, 2013

(86) PCT No.: PCT/DE2013/200297
§ 371 (c)(1),
(2) Date: Jun. 10, 2015

(87) PCT Pub. No.: WO2014/094755
PCT Pub. Date: Jun. 26, 2014

(65) Prior Publication Data
US 2015/0308508 A1 Oct. 29, 2015

(30) Foreign Application Priority Data

Dec. 20, 2012 (DE) .................. 10 2012 224 020

(51) Int. Cl.
*F16C 33/76* (2006.01)
*F16C 33/78* (2006.01)
*F16C 33/58* (2006.01)

(52) U.S. Cl.
CPC ........ *F16C 33/7823* (2013.01); *F16C 33/583* (2013.01); *F16C 33/768* (2013.01); *F16C 33/783* (2013.01); *F16C 33/7856* (2013.01)

(58) Field of Classification Search
CPC F16C 33/7826; F16C 33/783; F16C 33/7853; F16C 33/7856
(Continued)

(56) References Cited

U.S. PATENT DOCUMENTS 2,310,607 A * 2/1943 Batesole ............. F16C 33/7853
277/562
3,473,856 A * 10/1969 Helms .................. F16C 33/783
277/375

(Continued)

FOREIGN PATENT DOCUMENTS

DE 1856349 8/1962
DE 21 66 874 6/1976
(Continued)

*Primary Examiner* — Phillip A Johnson
(74) *Attorney, Agent, or Firm* — Davidson, Davidson & Kappel, LLC

(57) ABSTRACT

A bearing (91), more particularly a radial anti-friction bearing, including a bearing ring (61) with a lateral surface (63) formed by at least one undercut (65), and at least one sealing element (93) having an elastomer portion (103) and an elastic retaining lip (99), wherein the elastomer portion of the sealing element is received in the undercut at least in some portions, wherein the lateral surface of the undercut has a contour (67) with a contact portion (69) for axially securing the elastic retaining lip, as well as an axial contact surface (71), on which an axial contact surface (101) of the elastomer portion of the sealing element lies flat, is provided.

14 Claims, 4 Drawing Sheets

(58) Field of Classification Search
USPC .......................................................... 384/484
See application file for complete search history.

(56) References Cited

U.S. PATENT DOCUMENTS

| | | | |
|---|---|---|---|
| 3,709,572 A | | 1/1973 | Pethis |
| 4,805,919 A | * | 2/1989 | Wiblyi ................. F16J 15/3268 |
| | | | 277/560 |
| 6,402,158 B1 | | 6/2002 | Imazaike |
| 2003/0026509 A1 | | 2/2003 | Yakura et al. |
| 2007/0242909 A1 | | 10/2007 | Fournier |
| 2008/0265522 A1 | | 10/2008 | Barbera |

FOREIGN PATENT DOCUMENTS

| | | |
|---|---|---|
| DE | 10234935 | 5/2003 |
| EP | 0509729 | 10/1992 |
| EP | 0725224 | 8/1996 |
| JP | 2004278738 | 10/2004 |
| JP | 2006329388 | 12/2006 |
| JP | 2007010114 | 1/2007 |
| JP | 2010043693 | 2/2010 |

* cited by examiner

BEARING

The present invention relates to a bearing, in particular a radial rolling bearing, which includes a bearing ring having a lateral surface which is formed by at least one recess, as well as at least one sealing element which includes an elastomer section and an elastic retaining lip, the elastomer section of the sealing element being accommodated in the recess at least in sections.

BACKGROUND

A rolling bearing is used to support components which are movable with respect to each other. It generally includes two bearing rings which have integrated raceways. Rolling elements which roll on the raceways are situated between the bearing rings. To protect a rolling bearing, or the bearing interior between the bearing rings, against contaminants, spray water and an excessive loss of lubricating grease, at least one sealing element is usually inserted between the bearing rings of the rolling bearing.

To accommodate and fasten a sealing element, the bearing ring conventionally has a correspondingly designed lateral surface, with which the sealing element makes contact in the inserted state. In addition, an axial securing of the sealing element on the lateral surface of the bearing ring is necessary. After the sealing element is inserted, strict requirements are imposed, in particular on the dimensional accuracy and the dimensional stability of the bearing hole and the outer diameter of the bearing ring. A positioning of the sealing element on a bearing ring, which is largely free of shape and size tolerances in both the axial and radial directions, is desirable.

SUMMARY OF THE INVENTION

A first object of the present invention is to provide a bearing which is able to compensate for axial and radial tolerances of the bearing components used to seal a bearing.

The present invention provides bearings, in particular a radial rolling bearing, which includes a bearing ring having a lateral surface which is formed by a recess as well as a sealing element which includes an elastomer section and an elastic retaining lip, the elastomer section of the sealing element being accommodated in the recess at least in sections, and the lateral surface of the recess having a contour which includes a contact section for axially securing the elastic retaining lip. The contour of the recess furthermore includes an axial contact surface, on which an axial contact surface of the elastomer section of the sealing element planarly abuts.

The present invention is directed to the fact that axial displacements of a sealing element may be induced by radial displacements of the sealing element relative to the bearing ring. Up to now, a tilting of the sealing element has not been able to be ruled out when mounting the seal.

Moreover, to ensure the sealing function of a sealing element in a bearing ring, the decoupling of the corresponding shape and size tolerances is desired. However, this is not currently implementable using the conventional components for sealing a bearing.

Taking into account this aforementioned problem, the present invention recognizes that the requirement for a tolerance-independent positioning of a sealing element on a bearing ring may be met if the lateral surface of the recess has a contour which includes a contact section for axially securing the elastic retaining lip as well as an axial contact surface on which an axial contact surface of the elastomer section of the sealing element planarly abuts. The contact section prevents the sealing element from retracting against the direction of installation as well as an axial shifting or a tilting of the sealing element, whereby an axially secured positioning of a sealing element inserted into a bearing ring is facilitated without being influenced by possible axial and/or radial tolerances of the bearing components.

In the installed state of the sealing element in the recess of the bearing ring, the elastic retaining lip makes pretensioned contact with the contact section of the bearing ring. The largely tolerance-free retention of the sealing element in the recess of the bearing ring is facilitated by the combination of the pretensioned retaining lip and the planar contact of the elastomer section of the sealing element with the axial contact surface of the contour formed by the recess. In addition, the sealing element is situated on the lateral surface of the bearing ring in a form-locked and retraction-proof manner.

The radial guidance of the sealing element thus essentially takes place with the aid of the elastic part of the retaining lip. Due to the elastic design of the retaining lip, the latter may adapt, in particular, to the bearing ring or to the contour in the lateral surface of the recess. In this way, the positioning of the sealing element on a bearing ring may take place independently of the radial and axial size and form tolerances of the particular sealing components, and the overall tolerances of the sealing element and the bearing ring are decoupled from each other. Due to this tolerance-insensitive combination, predetermined shape tolerances, for example roundness or straightness, as well as the existing size tolerances on the bearing ring, are not or are only insignificantly influenced both during and after the mounting of the sealing element in the recess of the bearing ring.

In other words, an axially nondetachable, form-locked positioning, secured against tolerances, of a sealing element on a bearing ring is facilitated.

The recess for positioning the sealing element is introduced into the bearing ring, in particular as a recess, a recess turning process, for example, being used as the machining method for the purpose of manufacturing. The introduction of the recess is easy to carry out, in particular due to the shape of the recess.

The axial contact surface of the contour is not inclined and thus facilitates the planar contact of the inserted sealing element. During a radial displacement of the sealing element, an axial shifting or a tilting of the sealing element may thus be prevented and its secure positioning ensured.

In the present case, the sealing element includes, in addition to the elastomer section and the elastic retaining lip, in particular a sealing member having a reinforcing element and an elastomer component. The sealing element of the rolling bearing is inserted, in particular, between the inner bearing ring and the outer bearing ring, the fastening of the sealing element on one of the two bearing rings taking place with the aid of an essentially static [sic; sealing part]. The section of the sealing element on which the essentially static sealing part of the sealing element is provided may be introduced both into the lateral surface of an inner bearing ring and into the lateral surface of an outer bearing ring. The dynamic section of the sealing element may seal the bearing interior against the other of the two sealing rings, for example by forming a gap seal and/or a rubbing seal.

In one advantageous embodiment of the present invention, the contact section of the contour includes a shoulder which overlaps the elastic retaining lip of the sealing element for the axial securing thereof. The retaining lip, or, in particular, its radially elastic end section, is overlapped by the shoulder in the axial direction, where it is axially supported. The sealing element may thus engage with the recess during mounting when the retaining lip has passed the shoulder.

In this way, an axially form-locked connection is established between the sealing element and the bearing ring, which prevents the sealing element from retracting against the direction of installation, on the one hand, while simultaneously preventing it from tilting. For this purpose, the shoulder may be provided, for example, with an axial contact surface, on which the retaining lip planarly abuts in the installed state. In other words, the shoulder is used as a means for preventing the sealing element from retracting against the direction of installation.

Due to the combination of the shoulder and the axial contact surface of the contour of the recess, a secure positioning of the sealing element between the bearing rings of a rolling bearing may thus be easily ensured. The sealing element is furthermore accommodated by the elastic retaining lip in a manner that is insensitive to size and shape tolerances of the components.

In another advantageous embodiment of the present invention, the recess is provided with a radial clearance. The radial clearance prevents a massive contact between the elastomer section of the sealing element and the contour of the recess. In this way, a gap is maintained between the elastomer section and the contour, which acts as a so-called spring excursion reserve and compensates for tolerances, for example roundness errors, of both the recess and the sealing element.

The contact section advantageously merges directly with the radial clearance. The contact section in this case is essentially inclined. The design facilitates easy manufacturing of the recess or its contour by reducing dimensional complexity.

In another advantageous embodiment of the invention, a radial shoulder is additionally provided between the shoulder of the contact section and the radial clearance. The radial shoulder is preferably introduced into the contour in the form of a step and facilitates a design of the radial clearance having the required radial depth, which is at least 0.01 mm.

On the whole, the positioning of the sealing element on a bearing ring independently of the radial and axial size and shape tolerances of the particular components used to seal a bearing interior may take place with the aid of all aforementioned embodiments of the transition between the contact section and the radial clearance. In all embodiments, a massive contact between the elastomer section of the sealing element and the contour of the recess is furthermore prevented.

In another advantageous embodiment of the present invention, the axial contact surface of the recess merges with a raceway section. The raceway section may be used, for example, as a raceway for a rolling element inserted into a rolling bearing. In particular, the raceway section may be used to guide a rolling element cage.

In one particularly advantageous embodiment of the present invention, a circumferential, axial collar is provided in the transitional area between the axial contact surface of the recess and the raceway section. A rim formed on the bearing ring is elongated in the axial direction by the circumferential collar. Due to this elongation of the rim, a correspondingly enlarged rim surface is provided.

The rim surface is used, in particular, to guide a rolling bearing cage. A cage guidance with the aid of a rim surface of this type is used, in particular, in fast-running rolling bearings, which must withstand high accelerations and rotational speeds. For this purpose, a rolling bearing cage rests with its surface against the rim surface of the bearing ring in the installed state in a rolling bearing. A secure guidance of a rolling bearing cage may thus be achieved by a rim surface provided by the circumferential, axial collar, making optimum use of the available installation space. The axially circumferential collar is preferably provided on the lateral surface of the bearing ring by a recess formed therein.

The sealing element advantageously has a sealing member which includes a reinforcement. The reinforcement is inserted into the sealing member. The sealing member preferably essentially has an annular design. The reinforcement may also be manufactured as a ring, for example from a steel sheet, and ensures the necessary stability of the sealing element for a rolling bearing during operation. The elastomer sealing component of the sealing element may be, for example, a rubber which is injection-molded around the reinforcement.

To ensure the sealing function due to the secure positioning of a sealing element in a bearing ring and for the purpose of the desired decoupling of the corresponding shape and dimension tolerances, the dimensions of the sealing element and the bearing ring or the contour of the recess of the bearing ring are advantageously coordinated with respect to each other. The advantageous embodiments discussed below thus facilitate the provision of a bearing which permits an axially nondetachable, form-locked positioning of the sealing element on a bearing ring, which is tolerant against manufacturing-induced deviations.

The reinforcement preferably includes an essentially annular base body of material thickness s as well as a reinforcing section oriented inwardly against the axial contact surface of the recess, radius of curvature R being in a range between 0.2 mm and 2·s at the transition between the base body and the reinforcing section. Radius of curvature R may thus be selected as a function of the material thickness of the reinforcement or the base body of the reinforcement.

Thickness y of the elastic retaining lip may be selected, in particular, as a function of the material thickness of the reinforcement. Thickness y of the elastic retaining lip is preferably in a range between 0.15 mm and 1.2·s.

Radial thickness d of the elastomer section of the sealing element is advantageously in a range between 1.5·s and 4.5·s. Radial thickness d may thus also be selected, in particular, as a function of the material thickness of the base body of the reinforcement.

Axial thickness t of the transitional area in which the sealing body of the sealing element merges with the elastic retaining lip is, in particular, dependent on the radial thickness of the elastomer section of the sealing element. Axial thickness t in the transitional area is preferably in a range between 0.5·d and 1·d.

In one advantageous embodiment, recess width Et of the recess is in a range between 0.8·t and 1.2·t. Recess width Et may thus be selected, in particular, as a function of axial thickness t of the transitional area between the sealing member and the sealing element.

The bearing ring preferably has outer diameter D, radial distance a between the elastomer section of the sealing element and the base of the radial clearance being in a range between 0.03 mm and 0.004·D.

In another preferred embodiment, the shoulder of the contact section of the contour is set back radially at a distance X, distance X being in a range between 0.5·y and 1.5·y. Distance X may thus be selected, in particular, as a function of thickness y of the elastic retaining lip of the sealing element.

In the relaxed state, the retaining lip extends by a distance C radially beyond the shoulder of the contact section and/or beyond a control point, distance C being in a range between 0.02 mm and 2·y.

The elastomer section of the sealing element is advantageously set back in the recess by a radial distance b, radial distance b being in a range between 0.03 mm and 1.25·y.

The rolling bearing is preferably designed as a spindle bearing, in particular for use in machine tools. Spindle bearings are single-row angular ball bearings which include solid outer and inner bearing rings, between which ball races having massive rolling element cages are inserted. A spindle bearing is used specifically in machine tool manufacturing but also in other applications in which the strictest requirements with respect to accuracy or permissible rotational speed are imposed on the bearing. Spindle bearings for supporting the spindles of machine tools have proven themselves to be excellent, i.e., spindles of shafts having an integrated interface for accommodating a workpiece or a tool.

The recess may, in principle, be introduced either into the outer bearing ring or into the inner bearing ring. The recess is advantageously introduced into the outer bearing ring. The outer bearing ring is thus used for the axially nondetachable, form-locked positioning of a sealing element, which is tolerant against manufacturing-induced deviations in shape and size.

The recess is also advantageously introduced into the inner bearing ring, the positioning of the sealing element on the inner bearing ring taking place independently of the radial and axial size and shape tolerances of the particular sealing components. It should be taken into account that, in a recess provided in the inner bearing ring, the inner diameter of the inner bearing ring must be considered during dimensioning. In a recess introduced into the inner bearing ring, the inner bearing ring has inner diameter d, radial distance a between the elastomer section of the sealing element and the base of the radial clearance preferably being in a range between 0.03 mm and 0.004·d.

BRIEF DESCRIPTION OF THE DRAWINGS

The present invention is explained below on the basis of a drawing.

DETAILED DESCRIPTION

Figure 1:
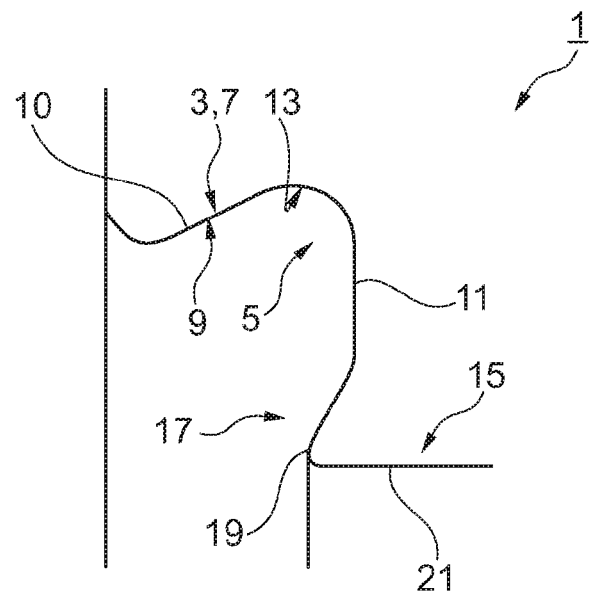
FIG. 1 shows a cross-sectional view of a detail of the lateral surface of a bearing ring.

FIG. 1 shows a cross-sectional view of a detail of a bearing ring 1 for accommodating a sealing element. Bearing ring 1 includes a lateral surface 3, which is formed by a recess 5. In the mounted state, a sealing element, or, in particular the elastomer section of a sealing element, may be positioned in this recess 5, at least in sections, and come into contact with lateral surface 3. In the present case, recess 5 is introduced into bearing ring 1 as a recess, with the aid of a recess turning process.

To position a sealing element, lateral surface 3 of recess 5 is provided with a corresponding contour 7 for this purpose. Contour 7 includes a contact section 9 for axially securing an inserted sealing element, a control point 10 on contact section 9 as well as an axial contact surface 11, which prevents the sealing element from tilting.

In the relaxed state, the retaining lip of a theoretically inserted sealing element extends radially beyond control point 10 of contact section 9 by a distance C.

Contact section 9 of contour 7 is inclined in the radial direction, against the direction of installation, and merges directly with a radial clearance 13. Due to the incline of contact section 9, it is ensured that an inserted sealing element may be positioned axially on contact section 9 or on lateral surface 3 of recess 5 in a form-locked manner. Radial clearance 13, in turn, prevents a massive contact between the sealing element and contour 7 of recess 5. In this way, a gap is maintained between the sealing element or the elastomer section of the sealing element and contour 7, which compensates for tolerances, for example roundness errors, of both recess 5 and the sealing element.

Axial contact surface 11, on the other hand, enables a sealing element to planarly abut with its axial contact surface in the installed state thereof, so that a tilting of the sealing element is prevented. A retraction of the sealing element against the direction of installation is also not possible due to the geometry of contour 7 of recess 5.

On the whole, an axially nondetachable positioning of a sealing element on lateral surface 3 of bearing ring 1 is achieved by the combination of contact section 9 and axial contact surface 11.

Bearing ring 1 is also provided with a raceway section 15. A circumferential, axial collar 19 is formed in transitional area 17 between axial contact surface [sic; section] 9 and raceway section 15. Collar 19 results in an elongation of rim surface 21, which extends away from bearing ring 1 in the axial direction. A secure guidance of a rolling bearing cage may thus be achieved by the elongation of rim surface 21, making optimum use of the available installation space.

Figure 2:
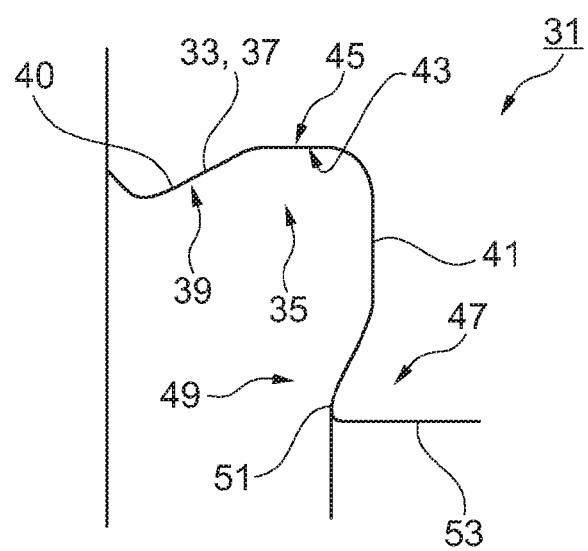
FIG. 2 shows a cross-sectional view of a detail of the lateral surface of another bearing ring.

FIG. 2 shows a cross-sectional view of a detail of another bearing ring 31 for accommodating a sealing element. Bearing ring 31 includes a lateral surface 33, which is introduced into recess 35, with the aid of a recess turning process. In the installed state, a sealing element which includes an elastomer section may be positioned in this recess 35, at least in sections, and come into contact with lateral surface 33.

Like lateral surface 3 according to FIG. 1, lateral surface 33 of recess 35 is provided with a corresponding contour 37, which includes a contact section 39 for axially securing an inserted sealing element, a control point 40 on contact section 39 as well as an axial contact surface 41. Axial contact surface 41 facilitates the planar contact of a sealing element accommodated in recess 35 with its axial contact surface, so that a tilting of the sealing element is prevented.

Once again, in the relaxed state, the retaining lip of a theoretically inserted sealing element extends radially beyond control point 40 of contact section 39 by a distance C.

Contact section 39 of recess 35 is inclined in the radial direction, whereby it is ensured that an inserted sealing element is held within recess 35, retraction-proof against the direction of installation. Contact section 39 merges with a radial clearance 43, the transition taking place via a radial contact surface 45, in contrast to FIG. 1. Radial clearance 43 facilitates a sufficiently great distance between an inserted sealing element and contour 37 of recess 35 of bearing ring 31, so that a hard contact between the sealing element and contour 37 is prevented.

Bearing ring 31 is provided with a raceway section 47. Circumferential, axial collar 51, which is provided in transitional area 49 between axial contact surface 43 and raceway section 47, again results in an elongation of rim surface 53, which extends away from bearing ring 31 in the axial direction. Collar 51 facilitates a particularly secure guidance of a rolling bearing cage, making optimum use of the available installation space.

Figure 3:
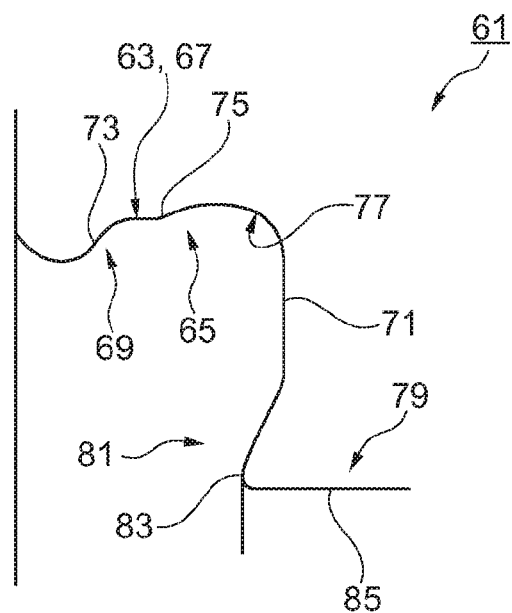
FIG. 3 shows a cross-sectional view of a detail of the lateral surface of another bearing ring.

FIG. 3 shows a cross-sectional view of a detail of another bearing ring 61. Bearing ring 61 includes a lateral surface 63, which is formed by a recess 65. In the mounted state, a sealing element may be positioned in this recess 65. The sealing element, or its elastomer section, then comes into contact with lateral surface 63, at least in sections. Recess 65 is introduced into bearing ring 61 as a recess, with the aid of a recess turning process.

Lateral surface 63 is provided with a corresponding contour 67, which includes both a contact section 69 and an axial contact surface 71 for a sealing element. Axial contact surface 71 facilitates the planar contact of an inserted sealing element and prevents the tilting thereof.

Contact section 69 is provided with a shoulder 73 for axially securing an inserted sealing element, in contrast to bearing rings 1, 31 according to FIGS. 1 and 2. Shoulder 73 may overlap an inserted sealing element or a part of the sealing element and is thus used to prevent a retraction against the direction of installation. The sealing element may thus engage with recess 65 during mounting when the sealing element, or an elastic retaining lip of the sealing element, has passed shoulder 73. In this way, an axially form-locked connection is established between the sealing element and bearing ring 61.

In addition, contour 67 of recess 65 is provided with a radial shoulder 75, which is introduced into contour 67 in the form of a step. A radial clearance 77 is provided by this shoulder 75. Clearance 77 prevents the contact between an inserted sealing element and lateral surface 63 of bearing ring 61. The radial depth of clearance 77 is 0.1 mm in the present case.

The bearing ring furthermore includes a raceway section 79. A circumferential, axial collar 83 is provided in transitional area 81 of bearing ring 61 between axial contact surface 71 and raceway section 79. Collar 83 results in an elongation of rim surface 85, which extends away from bearing ring 61 in the axial direction. A secure guidance of a rolling bearing cage may thus be achieved even in a small installation space.

Figure 4:
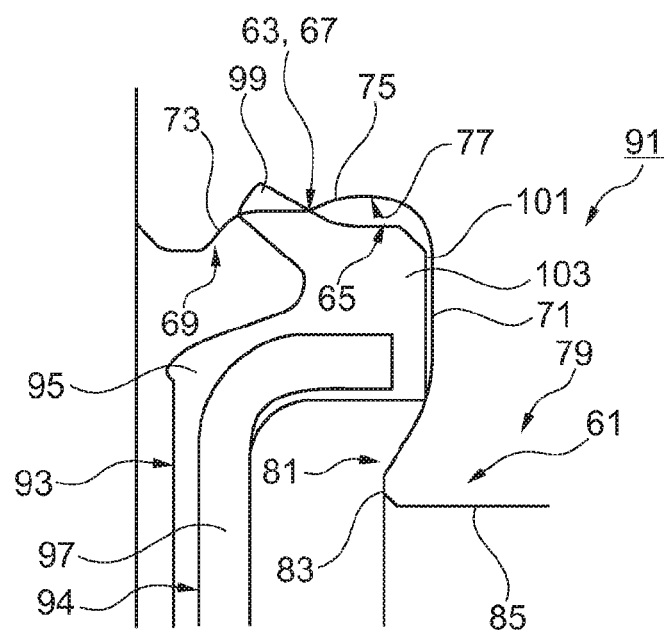
FIG. 4 shows a cross-sectional view of a detail of the bearing ring according to FIG. 3, including a theoretically inserted sealing element.

FIG. 4 shows a cross-sectional view of a detail of a bearing 91 designed as a spindle bearing, including bearing ring 61 according to FIG. 3 and a theoretically inserted sealing element 93. With regard to the description of bearing ring 61, reference is made at this point to the detailed description according to FIGS. 3 and 4.

Sealing element 93 inserted into bearing ring 61 includes a sealing member 94 which has an elastomer component 95 and a reinforcement 97. Elastomer component 95 is injection-molded around reinforcement 97. The sealing element, or elastomer component 95 of sealing element 93, has a radially elastic retaining lip 99 for the axial securing thereof as well as an axial contact surface 101 on its elastomer section 103.

In the fixedly inserted state of sealing element 93 into bearing ring 61, radially elastic retaining lip 99 may come into pretensioned contact with shoulder 73 of contact section 69. Axial contact surface 101 of sealing element 93 then abuts planarly on axial contact surface 71 of lateral surface 63 of bearing ring 61. In this way, sealing element 93 may be axially positioned in a form-locked manner in recess 65 of bearing ring 61. Moreover, undesirable changes to the size and shape tolerances are not to be feared either in sealing element 93 or on recess 65 or on contour 67 of bearing ring 61.

Figure 5:
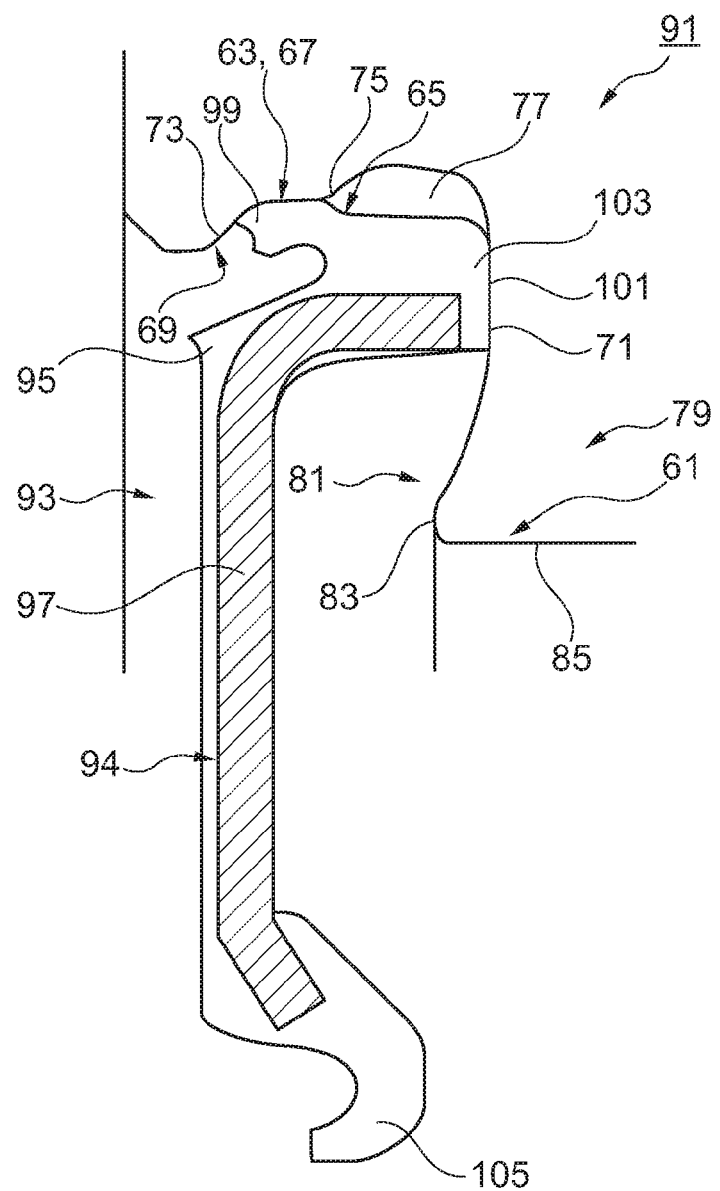
FIG. 5 shows a cross-sectional view of a detail of the bearing ring according to FIGS. 3 and 4, including the inserted sealing element according to FIG. 4.

FIG. 5 shows the fixed installation of sealing element 93 in bearing ring 61. Axial contact surface 101 of sealing element 93 then abuts planarly on axial contact surface 71 of lateral surface 63 of bearing ring 61. Radially elastic retaining lip 99, in turn, is in pretensioned contact with shoulder 73 of contact section 69, so that the radial guidance of sealing element 93 takes place via the radially elastic part of retaining lip 99. Shoulder 73 overlaps retaining lip 99 and may thus prevent a shifting of sealing element 93 against the direction of installation.

Radial clearance 77 formed by shoulder 75 prevents a widening of bearing ring 61 due to the avoidance of a massive contact between elastomer section 103 of sealing element 93 and lateral surface 63 or contour 67 of bearing ring 61.

On the whole, bearing 91 may thus ensure the axial securing of sealing element 93 on bearing ring 61 independently of the radial and axial manufacturing tolerances of the particular sealing components.

Sealing element 93 additionally has a sealing lip 105, which, in the installed state, is in rubbing contact with the outer circumference of the second bearing ring of rolling bearing 91 or has a gap to the outer circumference of the second bearing ring, for the purpose of sealing the bearing interior. The second bearing ring is not shown in the present case.

Figure 6:
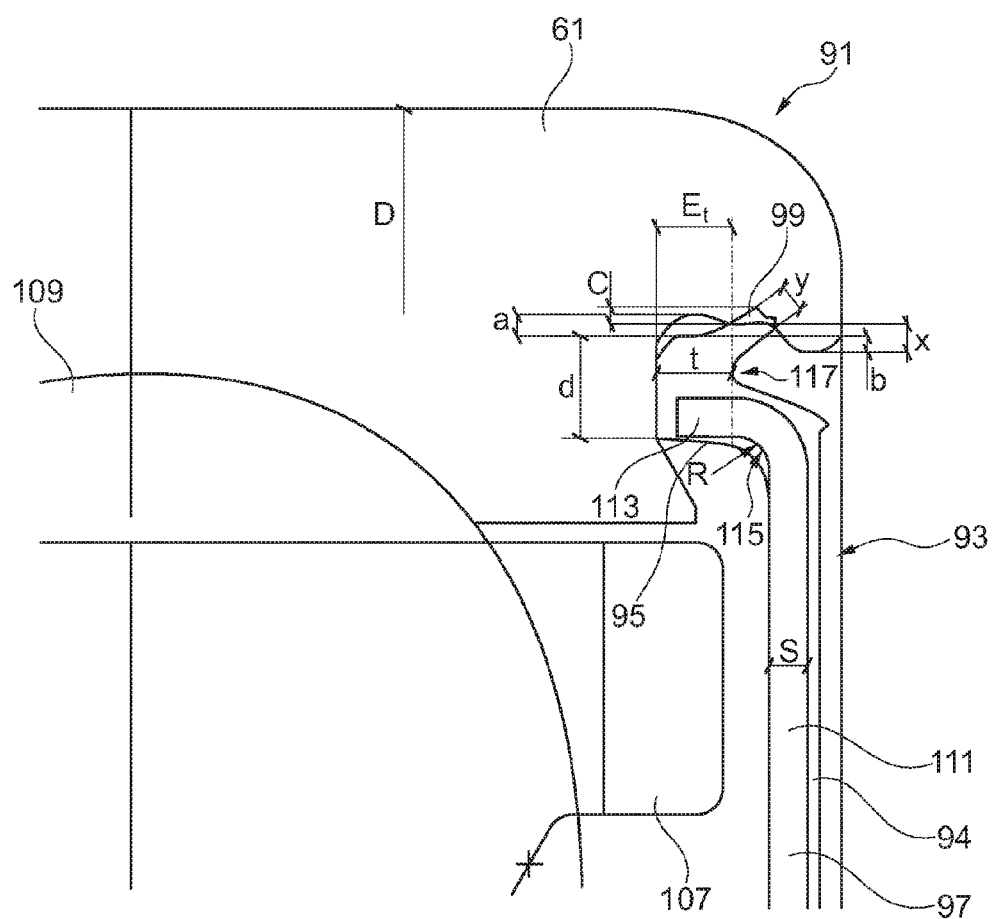
FIG. 6 shows a cross-sectional view of a detail of another bearing, including a sealing element inserted into a bearing ring.

FIG. 6 shows bearing 91 according to FIGS. 4 and 5, including sealing element 93, which is theoretically inserted into bearing ring 61. In the present case, axially circumferential collar 83 is clearly apparent, which is situated in transitional area 81 between axial contact surface 71 of contour 67 of bearing ring 61 and raceway section 79 and is used to elongate rim surface 85. Rim surface 85 facilitates a particularly secure guidance of rolling bearing cage 107 and rolling elements 109 guided therein, making optimum use of the available installation space.

For the further description of bearing 91, reference is made at this point to the detailed description in FIGS. 3 through 5.

In FIG. 6, reference is made to the dimensioning parameters of sealing element 93 and bearing ring 61, or contour 67 of recess 65 of bearing ring 61. To ensure the retaining function by positioning sealing element 93 on bearing ring 61, and for the purpose of the desired decoupling of corresponding shape and size tolerances, the dimensions of sealing element 93 and bearing ring 61 are advantageously coordinated with respect to each other.

Reinforcement 97 of sealing element 93 includes an essentially annular base body 111 of material thickness s as well as a reinforcing section 113 oriented inwardly against axial contact surface 71 of recess 65. Radius of curvature R at transition 115 between base body 111 and reinforcing section 113 may be in a range between 0.2 mm and 2·s. In the present case, radius of curvature R has a value of 0.5 mm.

Thickness y of elastic retaining lip 99 of sealing element 93 may assume values between 0.15 mm and 1.2·s and has a value of 0.3 mm according to FIG. 6. Radial thickness d of elastomer section 103 of sealing element 93, which may be, in particular, in a range between 1.5·s and 4.5·s, has a value of 2.5·s in the present case.

Sealing member 94 of sealing element 93 merges with elastic retaining lip 99 in a transitional area 117. In this transitional area 117, axial thickness t may be in a preferred range between 0.5·d and 1·d. In the present case, axial thickness t has a value of 0.7·d.

Recess width Et of recess 65 may assume values which are in a range between 0.8·t and 1.2·t. In the present case, recess width Et, which has a value of 1·t, corresponds to thickness t in transitional area 117, in which sealing member 94 merges with retaining lip 99.

Radial distance a between elastomer section 103 of sealing element 93 and the base of radial clearance 77, i.e., the radially lowest point, is dependent on outer diameter D of bearing ring 61. Radial distance a may advantageously be in a range between 0.03 mm and 0.004·D, it having a value of 0.13 mm in the present case.

Shoulder 73 of contact section 69 of contour 67 is set back radially in recess 65 by a distance X, distance X being able to be, in particular, in a range between 0.5·y and 1.5·y. According to FIG. 6, distance X has a value of 1·y. In the present case, distance X thus has the value of thickness y of elastic retaining lip 99.

In the relaxed state, retaining lip 99 extends radially beyond shoulder 73 of contact section 69 by a distance C. Distance C is advantageously in a range between 0.02 mm and 2·y and, in the present case, has a value of 0.7·y.

Elastomer section 103 of sealing element 93 is set back in recess 65 by a radial distance b, radial distance b preferably being in a range between 0.03 mm and 1.25·y. According to the present embodiment, distance b has a value of 0.6·y.

LIST OF REFERENCE NUMERALS 1 bearing ring
3 lateral surface
5 recess
7 contour
9 contact section
10 control point
11 axial contact surface
13 clearance
15 raceway section
17 transitional area
19 collar
21 rim surface
31 bearing ring
33 lateral surface
35 recess
37 contour
39 contact section
40 control point
41 axial contact surface
43 clearance
45 radial contact surface
47 raceway section
49 transitional area
51 collar
53 rim surface
61 bearing ring
63 lateral surface
65 recess
67 contour
69 contact section
71 axial contact surface
73 shoulder
75 radial shoulder
77 clearance
79 raceway section
81 transitional area
83 collar
85 rim surface
91 bearing
96 sealing element
94 sealing member
95 elastomer component
97 reinforcement
99 retaining lip
101 axial contact surface
103 elastomer section
105 sealing lip
107 rolling bearing cage
109 rolling element
111 base body
113 reinforcing section
115 transition
117 transitional area

What is claimed is:

1. A bearing comprising:
   a bearing ring having a lateral surface formed by at least one recess, and
   at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; wherein the recess is additionally provided with a radial clearance;
   wherein a radial shoulder is additionally provided between the shoulder of the contact section and the radial clearance.

2. A bearing comprising:
   a bearing ring having a lateral surface formed by at least one recess, and
   at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; wherein the sealing element includes a sealing member having a reinforcement;
   wherein the reinforcement includes an annular base body of material thickness s as well as a reinforcing section oriented inwardly against the axial contact surface of the recess, radius of curvature R being in a range between 0.2 mm and 2·s at the transition between the base body and the reinforcing section.

3. The bearing as recited in claim 2 wherein a thickness y of the elastic retaining lip of the sealing element is in a range between 0.15 mm and 1.2·s.

4. The bearing as recited in claim 2 wherein a radial thickness d of the elastomer section of the sealing element is in a range between 1.5·s and 4.5·s.

5. The bearing as recited in claim 4 wherein the sealing member of the sealing element merges with the elastic retaining lip in a transitional area, axial thickness t in the transitional area being in a range between 0.5·d and 1·d.

6. The bearing as recited in claim 5 wherein the recess width Et of the recess is in a range between 0.8·t and 1.2·t.

7. A bearing comprising:
   a bearing ring having a lateral surface formed by at least one recess, and
   at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; wherein the recess is additionally provided with a radial clearance;
wherein the bearing ring has an outer diameter D, and the radial distance a between the elastomer section of the sealing element and the base of the radial clearance is in a range between 0.03 mm and 0.004·D.

8. A bearing comprising:
   a bearing ring having a lateral surface formed by at least one recess, and
   at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; wherein the contact section of the contour includes a shoulder overlapping the elastic retaining lip of the sealing element for the axial securing thereof, the elastic retaining lip having a thickness y;
wherein the shoulder of the contact section of the contour is set back radially in the recess by a distance X, the distance X being in a range between 0.5·y and 1.5·y.

9. A bearing comprising:
   a bearing ring having a lateral surface formed by at least one recess, and
   at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; wherein the contact section of the contour includes a shoulder overlapping the elastic retaining lip of the sealing element for the axial securing thereof, the elastic retaining lip having a thickness y;
wherein, in the relaxed state, the retaining lip extends radially by a distance C radially beyond the shoulder or beyond a control point of the contact section, the distance C being in a range between 0.02 mm and 2·y.

10. A bearing comprising:
    a bearing ring having a lateral surface formed by at least one recess, and
    at least one sealing element including an elastomer section and an elastic retaining lip, the elastomer section of the sealing element being accommodated in the recess, at least in sections, the lateral surface of the recess having a contour including a contact section for axially securing the elastic retaining lip, as well as an axial contact surface, on which an axial contact surface of the elastomer section of the sealing element planarly abuts on the axial contact surface; the elastic retaining lip having a thickness y;
wherein the elastomer section of the sealing element is set back in the recess by a radial distance b, the radial distance b being in a range between 0.03 mm and 1.25·y.

11. The bearing as recited in claim 10 wherein the bearing is a machine tool spindle bearing.

12. The bearing as recited in claim 10 wherein the recess is introduced into an outer bearing ring.

13. The bearing as recited in claim 10 wherein the recess is introduced into an inner bearing ring.

14. A radial rolling bearing comprising the bearing as recited in claim 10.

* * * * *